WENDELL E. MILLER
INVENTOR.

ATTORNEY

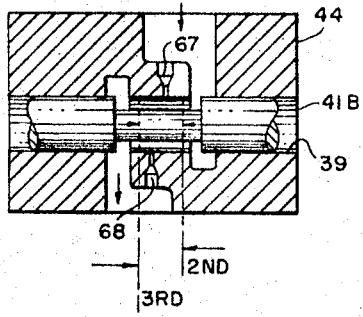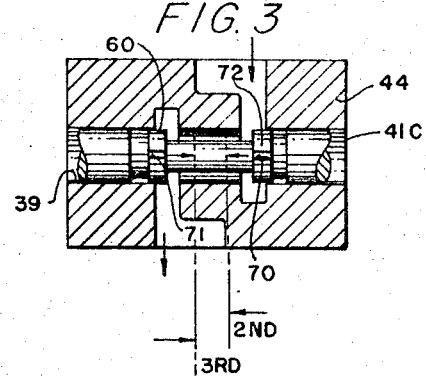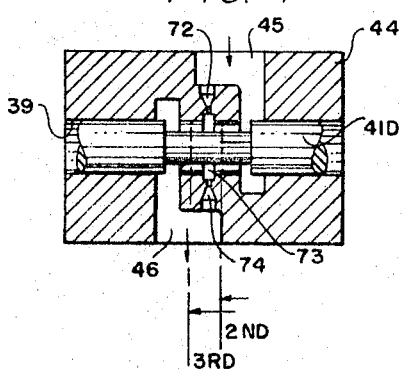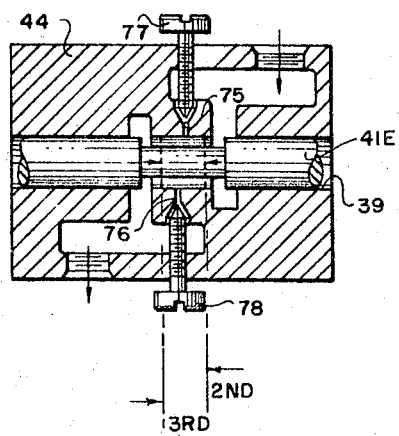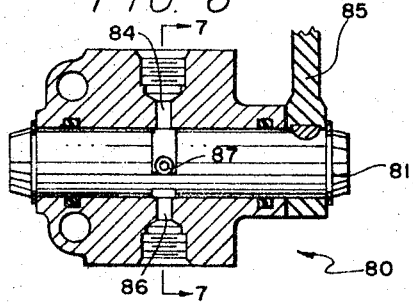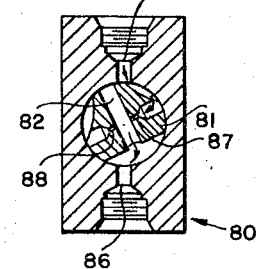

Aug. 26, 1969 W. E. MILLER 3,463,034
ACCELERATION CONTROL FOR VARIABLE SPEED TRANSMISSIONS
Filed Oct. 23, 1967 3 Sheets-Sheet 3

WENDELL E. MILLER
INVENTOR.

BY *Hubert Miller*

ATTORNEY

United States Patent Office 3,463,034
Patented Aug. 26, 1969

3,463,034
ACCELERATION CONTROL FOR VARIABLE
SPEED TRANSMISSIONS
Wendell E. Miller, Hutchinson, Kans., assignor to The
Cessna Aircraft Company, Wichita, Kans., a corporation of Kansas
Filed Oct. 23, 1967, Ser. No. 677,194
Int. Cl. F16h 47/02
U.S. Cl. 74—733                                    13 Claims

ABSTRACT OF THE DISCLOSURE

A fluid volume flow control device for interposition in a flow line which conducts fluid from a pressure source to a fluid pressure actuated mechanism, the rate of operation of which mechanism is dependent on the volume flow of fluid which is permitted to reach the mechanism through the flow line. The control device is adjustable to provide several different specific rates of flow through the line to the pressure actuated mechanism for any given pressure from the source, thereby providing a like number of different and corresponding specific rates of operation for the fluid actuated mechanism. One primary use of the invention is to adjust the rate of acceleration of the output shaft of a variable speed transmission, which in turn drives a multiple gear transmission, in such a manner that the rate of acceleration of the output shaft of the gear transmission will be substantially the same in any selected gear ratio.

---

More specifically, the control is concerned with the problems of acceleration and deceleration of a vehicle having a power train which includes a conventional variable speed transmission—coupled in driving relation with a mechanical gear transmission. Drive trains of this type have particular utility in large mass vehicles such as tractors, trucks, self-propelled farm machinery, along with static applications in lathes, electrical generators and other machinery.

A hydrostatic type variable speed transmission utilizes the combination of a variable displacement piston pump connected in driving relation with a fixed or variable displacement fluid motor to provide a high starting torque with a wide range of motor output shaft speeds. Transmissions of this type are described in detail in U.S. Patent No. 3,238,724.

To operate the power train on a self-propelled agricultural combine embodying this invention, the desired mechanical gear ratio is first selected, and then the pump displacement is increased from a zero flow condition to a maximum flow. The torque from the motor shaft of the hydraulic transmission is transmitted to the gear transmission which in turn drives the wheels of the vehicle. If the first gear of the gear transmission is selected, the vehicle accelerates from zero to 4 m.p.h. as the swash plate of the pump is varied from zero to its maximum inclination. The speed range of the second gear is from zero to 12 m.p.h., while the speed ranges in the higher gears are still greater. The rate at which the vehicle will accelerate in any of the gears is dependent upon how fast the swash plate is rotated (hereafter referred to as swash plate velocity).

In the prior art transmissions of this type there is only one rate of flow to the servo cylinders which actuate the swash plates, consequently the time interval from zero to maximum inclination is the same regardless of the gear ratio selected. Therefore, it would take the same time interval to accelerate from zero to 4 m.p.h. in first gear as it would from zero to 20 m.p.h. in third gear. For example, in the first gear range of zero to 4 m.p.h., a reasonable acceleration time would be 4 seconds. Obviously, an attempt to accelerate in third gear from zero to 20 m.p.h. in 4 seconds would overload and stall the engine. Also, the corresponding deceleration in third gear (from 20 m.p.h. to zero in 4 seconds) would be equally damaging. If the swash plate velocity is changed be give a period of travel of 20 seconds rather than 4 it provides an acceptable acceleration rate in third gear, but first gear is then so slow that the maneuverability of the vehicle is drastically curtailed. A compromise between a high and a low swash plate velocity has been used but at the expense of the advantages which normally are provided by the use of a hydrostatic transmission.

The present invention alleviates the above mentioned problems by altering the swash plate velocity as the mechanical gears are shifted, so as to provide a separate rate of acceleration for each gear ratio. This is accomplished by inserting different size orifices into the path of fluid flow to or from the swash plate servo cylinder. For example, as the mechanical transmission is shifted from first to second gear a smaller orifice is interposed in the servo flow path. In second gear it takes the swash plate 12 seconds to travel from zero to maximum flow rather than the 4 seconds swash plate velocity permitted in first gear. Consequently, the combine or other vehicle has fast acceleration in first gear (zero to 4 m.p.h.) for high maneuverability, without the engine overload and dangerous deceleration in the higher gears.

It is therefore the principal object of this invention to provide a new and improved acceleration and deceleration control for compounded gear and variable speed transmissions.

Another object of the present invention is to provide a selective speed control for the swash plate servo in a hydromechanical power train whereby a more efficient utilization is made of the power capabilities of the hydrostatic transmission.

An additional object of the invention is to provide a selective speed control for the swash plate servo to give the vehicle a wide range of acceleration and deceleration rates.

Another object of the invention is to provide selective speed controls for the swash plate servo in relation to the respective gear ratios selected, with corresponding swash plate velocity when the vehicle is decelerating rather than accelerating.

Further objects and advantages of the invention will be in part apparent and in part pointed out specifically hereinafter in connection with the accompanying drawings, in which:

FIG. 2 is a fragmentary section of a control valve spool and related passages showing the control valve of this invention in a modified form;

FIG. 3 is a view similar to FIG. 2 showing an additional form of control valve embodying the invention;

FIG. 4 is a view similar to FIG. 2 showing a further modified form of control valve;

FIG. 5 is a view similar to FIG. 2 showing another modified form;

FIG. 6 is a fragmentary section of a still different modified type of valve embodying the invention with the flow control spool in a position affording maximum flow through the valve;

FIG. 7 is a section taken along lines 7—7 of FIG. 6, but with the spool partially rotated counterclockwise to define a smaller flow area than is defined by the spool position shown in FIG. 6;

Figure 1:
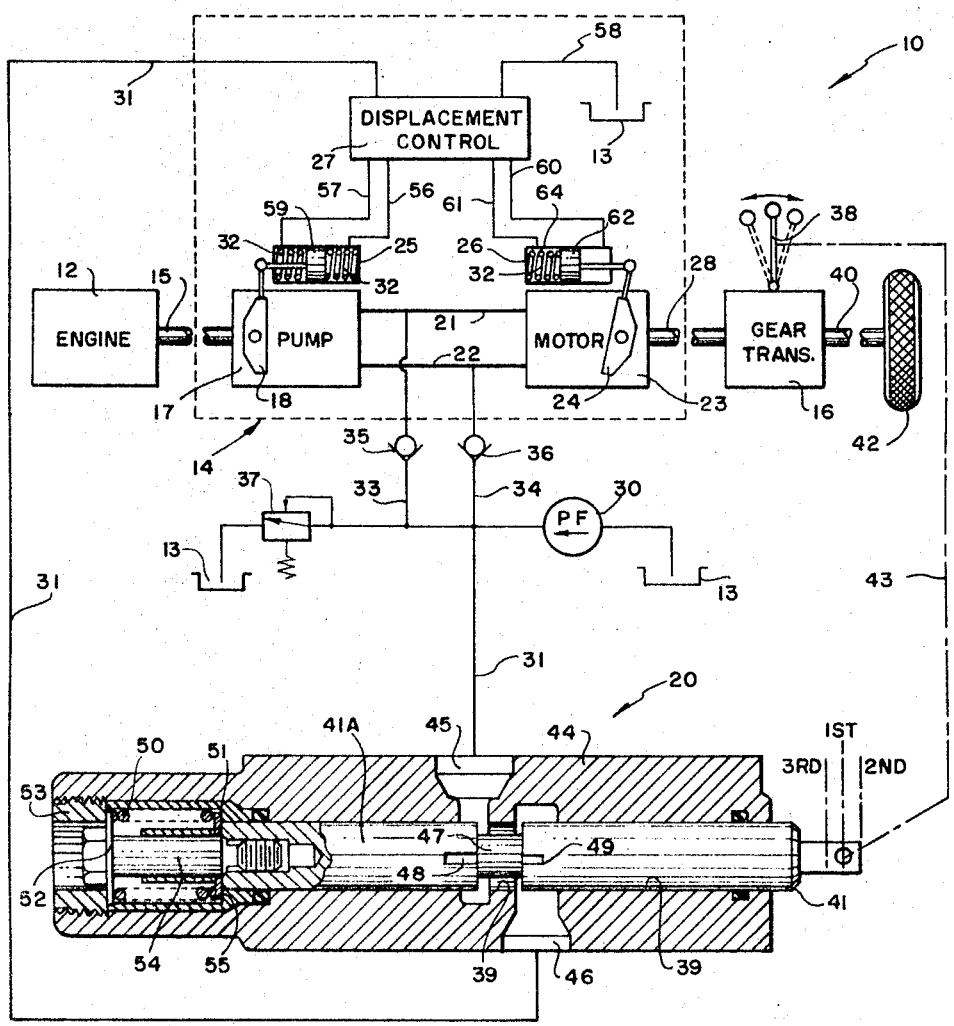
FIG. 1 is a view, partially a section and partially schematic, of a hydromechanical drive system showing the acceleration control valve embodied in the present invention in detailed longitudinal section with portions broken away.

Referring now to the drawings for a detailed description of the invention and more specifically to FIG. 1 which illustrates in partially schematic form a hydromechanical drive system generally identified by reference numeral 10. The system 10 includes an engine 12, a hydrostatic transmission 14 (encompassed in dotted line), a mechanical gear transmission 16, and an acceleration control valve 20. The engine or power plant 12 supplies constant mechanical energy to the hydrostatic transmission 14 through a drive shaft 15. The hydrostatic transmission 14 could be, for example, the type shown in U.S. Pat. No. 3,238,724. A mechanical variable speed transmission could also be used with the invention as later described in connection with FIGS. 8 to 10. The transmission 14 in FIG. 1 includes a variable volume axial piston pump 17 with a tiltable swash plate 18. Connected to the pump 17 in driving relation through a pair of conduits 21 and 22 is a hydraulic motor 23 having a structure similar to the pump 17. The motor 23 may be of the type having a tiltable swash plate 24, as seen in the drawing, or a stationary plate, depending upon the speed range desired. Connected to each of the swash plates 18 and 24 through a mechanical linkage are servo cylinders 25 and 26. The displacement control 27 is shown in block form since various types of controls could be used. The function of the control 27 is to sequentially position the servo cylinders 25 and 26 and their respective swash plates to accomplish a range of speeds at the output shaft 28, as will be further described in detail. The fluid pressure for operation of the servos 25 and 26 is supplied from a low pressure constant volume pump 30 through line 31. The springs 32 in the servos provide a constant biasing force to return the pistons 59 and 62 to their neutral positions. The pump 30 also acts as a supercharger in supplying fluid to the pump return line 21 or 22 depending upon which line is serving as the pump discharge line. The check valves 35 and 36 prevent any high pressure pump discharge fluid in lines 21 or 22 from entering the low pressure supply lines 33 and 34. Relief valve 37 serves to protect the pump 30 by preventing over pressurization in lines 31, 33 and 34, yet maintains those lines under a continuous low pressure.

The output shaft 28 of the hydraulic transmission 14 is connected to drive the mechanical gear transmission 16. Although the manual gear selector 38 and valve 20 are illustrated as having three gear positions, they could have more or less, depending upon the specific need. The gear transmission 16 can be of any conventional type with or without a clutch. The output shaft 40 of gear transmission 16 is illustrated as being directly connected to the driving wheels 42 of the vehicle, but a differential could of course be interposed therebetween if needed.

The acceleration selector valve 20, which is the subject matter of the present invention, controls the speed of servos 25 and 26, and includes a movable spool 41A, positioned in a bore 39, and which is moved to different positions in response to changes in position of gear shift lever 38 of the transmission 16. The connecting linkage is symbolically illustrated by a dotted line 43 connecting the manual selector 38 with the end of valve spool 41A. Any appropriate mechanical, hydraulic, or electrical type of linkage 43 could be utilized.

Intersecting bore 39 in valve body 44 are inlet and outlet passages 45 and 46 respectively. A reduced diameter portion 47 of the spool 41A provides a connecting passage between the inlet and outlet passages 45 and 46 when the spool is positioned as illustrated. The reduced section 47 and the adjacent portions of bore 39 define the proper flow restriction for the swash plate velocity in the first gear position. As the transmission 16 is shifted to second gear, the spool 41A is moved to the right until only a portion of slot 48 is exposed to passage 45. The flow path between passages 45 and 46 is thus restricted to the flow area afforded by slot 48, which provides the desired rate of acceleration in second gear. When the transmission 16 is shifted to third gear, the spool 41A moves to the left of the illustrated center position until only a portion of slot 49 is exposed to passage 46. The flow area of slot 49 is smaller than that of slot 48, and thus provides a desired slower swash plate velocity in third gear. At the left end of spool 41A is a conventional spool centering structure 50 which spring biases the spool to the illustrated center position. In operation, the spring 50 bears against washer 52 and flanged sleeve 51. Since the washer 52 and sleeve 51 are slidably mounted on bolt 54, the spool 41A compresses spring 50 as the spool moves in either direction from the illustrated position. The spring assembly may include a detent mechanism (not shown) which could serve to hold the spool in either the second or third gear position.

Operation of FIGURE 1

Initially the hydrostatic transmission 14 is neutrally positioned with the pump swash plate 18 in zero displacement position and the motor output shaft 28 not rotating. With the pump swash plate so positioned, the gear of the mechanical transmission 16 is selected. If, for example, a low speed range is desired, the first gear would be used. To begin movement of the vehicle, a manual signal is given to the displacement control 27 by the vehicle operator, which allows fluid pressure from line 31 to pass into the right end of servo 25 through line 56, while the left end is drained to reservoir 13 through lines 57 and 58. As the servo 25 begins to tilt the swash plate 18 in a counterclockwise direction, the pump begins to discharge fluid through line 22. As the swash plate 18 continues to rotate, the pump discharge flow increases as does the speed of fluid motor 23. The rate of flow into the right end of the servo 25 and consequently the rate of movement of the swash plate 18 is governed by the restriction imposed by the acceleration control valve 20 on the volume flow of pressure fluid through line 31. If the motor 23 has a fixed displacement, that is, if the angular position of the motor swash plate is fixed, the maximum speed of the drive wheel 42 is achieved when the swash plate 18 of the pump reaches its maximum displacement angle. However, in a system having a variable displacement motor, as illustrated, additional speed of the motor output shaft 28 can be obtained. From the neutral position previously mentioned, the motor swash plate 24 is tilted to its maximum displacement angle, as shown in FIG. 1, which requires a maximum amount of fluid for each revolution of shaft 28. As the pump displacement reaches its maximum, the displacement control 27 allows fluid to flow into the right end of servo 26 through line 60 while fluid from the left end is allowed to drain through lines 61 and 58. The movement of piston 62 to the left causes the swash plate 24 to decrease the motor displacement to a minimum. The effect of this decrease is to require less volume of fluid for each revolution, which in effect increases the speed of the motor output shaft 28, since the flow from the pump 17 remains at a maximum. Therefore, the maximum speed of drive wheel 42 is achieved with the pump 17 at maximum displacement and the motor 23 at minimum displacement.

With the acceleration control valve 20 in its first gear position, as illustrated, the drive wheel 42 will accelerate to its maximum speed (4 m.p.h.) in a relatively short time interval. If a higher speed range with substantially the same acceleration rate is desired, the gear selector 38 is moved to the second gear position. The movement of selector handle 38 positions valve spool 41A to the right, and restricts the flow to the flow area of slot 48. With the decreased flow rate, the servo plungers 59 and 62 move swash plates 18 and 24 to their maximum speed positions more slowly, yet the vehicle acceleration rate is substantially the same. For purposes of illustration, the speed ranges of the first and second gears are 0–4 m.p.h. and 0–12 m.p.h. respectively In the second gear position, it would take approximately 12 seconds to achieve maximum vehicle speed of 12 m.p.h. because of the decreased flow to the servos, whereas in the first gear it would take 4 seconds to reach 4 m.p.h. If the highest speed range is desired, selector 38 is moved to the third gear position which accordingly moves spool 41A to the left, restricting flow to the flow area provided by smaller slot 49. In this spool position the flow to the servos is further restricted, with a time of approximately 20 seconds being required to reach maximum vehicle speed (20 m.p.h.).

Deceleration

The type of displacement control 27 illustrated schematically in FIG. 1 is clearly shown and described in the above identified U.S. Patent No. 3,238,724. To slow the vehicle from its top speed, or to bring it to a stop, the operator adjusts the displacement control to "slow" or "stop." Such adjustment first causes pressure fluid to flow from supply line 31 through line 61 to the left end of motor servo 26, and from the right end of servo 26 through lines 60 and 58 to reservoir, thus moving servo piston 62 to the right and moving motor swash plate 24 to its maximum displacement position. Subsequently, in sequence, the displacement control directs pressure fluid from line 31 through line 57 to the left end of servo 25, and fluid from the right end is forced to flow through lines 56 and 58 to reservoir. Servo piston 59 is moved to the right in FIG. 1, and swash plate 18 is moved toward or into its zero displacement position, depending on displacement control adjustment by the operator.

Thus it will be seen that at times fluid may flow in either direction through lines 56, 57, 60 and 61, yet the flow restricting valve 20 will control and match the acceleration and deceleration rate to the particular transmission gear ratio which has been selected by the shift lever 38.

It is not essential to the acceleration control system of this invention that the flow restricting valve 20 be placed in a conduit which connects the fluid pressure source (pump 30) to the servo being controlled. Instead it may be placed in any conduit through which fluid is forced to flow when the servo is actuated, including the line 58 which conducts discharged fluid to the reservoir 13. In FIG. 1, the valve 20 could be placed in any one of the lines 56, 57, 58, 60 or 61. In case there is no serial flow between the servos 25 and 26, as in this case, one valve 20 could be placed either in line 56 or 57, and a second valve 20 could be placed in either line 60 or 61.

FIGS. 2 to 7 inclusive

In the modified valve structure of FIG. 2, the spool orifice notches 48 and 49 have been replaced by orifices 67 and 68 in the valve body 44. In the first gear position, as illustrated, fluid flows across the reduced diameter portion of the spool 41B, as in FIG. 1. In the second gear position, the spool is moved to the left and the bore 39 is completely blocked by spool 41B, as indicated by the dotted line position labeled 2nd, thereby limiting the flow through large orifice 67. In the third gear position, the spool is moved to the right, indicated by the dotted line position labeled 3rd, and permits flow only through smaller orifice 68.

In FIG. 3 another modified valve spool 41C is shown in first gear position. It has separate land portions 60 and 72, each having a different size longitudinal V-notch, 71 and 70. In the second gear position land 72 closes bore 39 to flow except through notch 72. In the third gear position the spool 41C moves in the opposite direction until land 60 blocks the flow except through notch 71. The size of the notch governs the rate of acceleration in each gear.

In the FIG. 4 embodiment the valve spool 41D is moved to the left to assume its second gear position, and further to the left to assume its third gear position. In the second gear position spool 41D blocks the flow from passage 45 to bore 39 and permits flow only through larger orifice passage 72. In the third gear position the flow path is further restricted through passage 73 and smaller orifice 74.

The FIG. 5 embodiment is identical to FIG. 2 except that the orifices 75 and 76 are variable instead of fixed. By adjusting the metering pin 77, the second gear acceleration rate can be varied to suit the specific application. In the previous illustration the second gear time interval from 0 to 12 m.p.h. was approximately 12 seconds. This rate of acceleration can be increased or decreased by the previously mentioned metering pin adjustment. The third gear orifice 76 can be adjusted by pin 78 in a like manner.

FIGS. 6 and 7 depict a rotary form of acceleration control valve 80 having a spool 81 which rotates rather than moves longitudinally, as in the previous illustrations. In the first gear position, center passage 82 in the spool is directly aligned with passages 84 and 86, allowing flow therethrough with a minimum restriction. In the second gear position, spool 81 is rotated by operator 85 in a counterclockwise direction to the position seen in FIG. 7. In this position, direct fluid flow into passage 82 is blocked and flow is through orifice 87, allowing a slower rate of flow to the servos 25 and 26. In the third gear position, the spool 81 is rotated in the opposite direction until passage 84 is opened only to the smaller orifice 88.

While the various embodiments of the acceleration control valve 20 are shown with three positions, it would be an easy matter to add additional flow restricting positions if a mechanical transmission had more than three gear ratios.

While in FIG. 1 the acceleration control valve 20 is shown in the supply line 31 to the displacement control, it can also be located in the return lines 57, 58 or 61.

FIGURE 8

Figure 8:
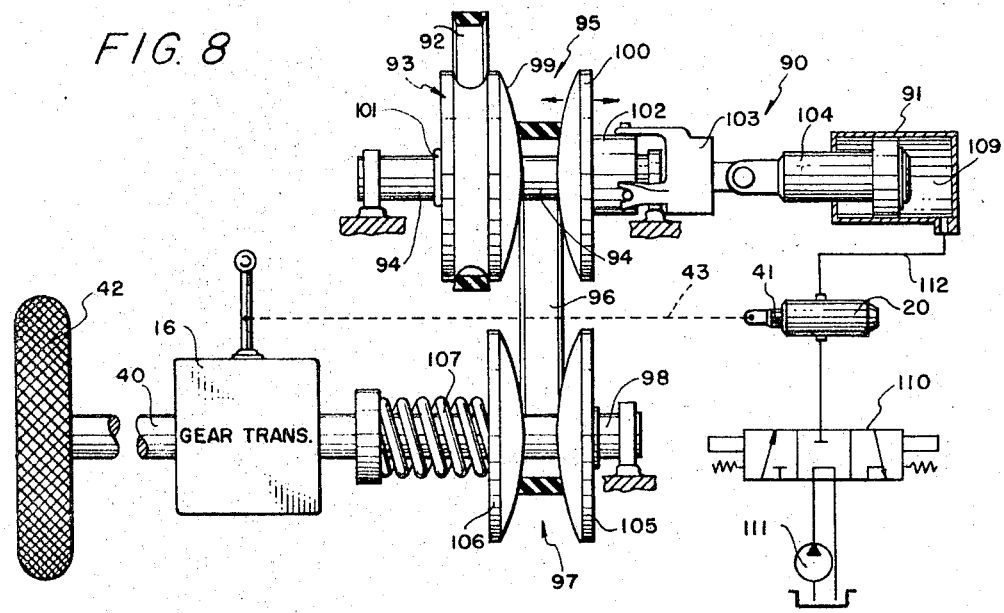
FIG. 8 is a view, partially in section and partially schematic of a drive train showing the acceleration control valve used with a belt type mechanical variable speed transmission.
Figure 9:
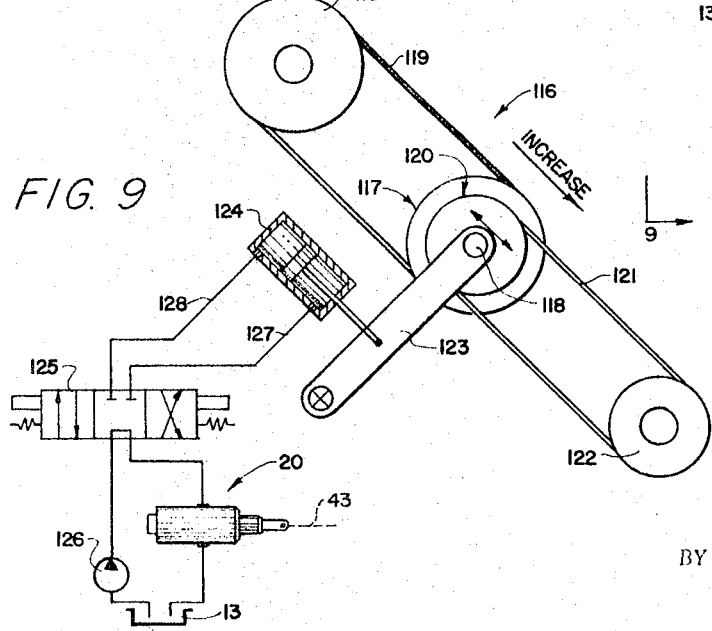
FIG. 9 is a partially schematic view of a drive train showing the acceleration control valve as used with a modified form of belt type variable speed transmission.

In FIG. 8 the acceleration control valve 20 is shown in a compounded transmission system which incorporates a belt-type mechanical variable speed transmission 90 rather than the hydrostatic transmission 14 illustrated in FIG. 1. Instead of controlling the rate of change of the pump and motor swash plate angles, as in the hydrostatic drive, the acceleration control valve 20 controls the rate at which servo 91 changes the effective diameter of a conventional variable diameter pulley 95 in a V-belt transmission 90. Drives of this type along with the modified type shown in FIG. 9, are currently used in many types of vehicles.

The power train illustrated includes a remote prime mover (not shown) which drives V-belt 92. Belt 92 in turn drives pulley 93 and shaft 94. Adjacent pulley 95 drives V-belt 96 which in turn drives pulley 97 and shaft 98. Shaft 98 supplies mechanical energy to gear transmission 16 the output shaft 40 of which is connected to the traction wheels 42 of the vehicle. The pulley 95 is a variable diameter type, having a pair of concave-shape sheaves 99 and 100. Sheave 99, being the outer surface of pulley 93, is restrained from any longitudinal movement on shaft 94 by retaining ring 101, while sheave 100 is longitudinally movable on shaft 94. Journaled to sheave 100 is sleeve 102, which is movable longitudinally along shaft 94 by a connector 103, operatively attached to piston rod 104 of servo cylinder 91. As rod 104 is extended, the sheaves 99 and 100 are moved closer together, causing the pulley 95 to increase its diameter. Pulley 97 has a similar structure, with sheave 105 being stationary with respect to shaft 98, while sheave 106 is biased toward sheave 105 by spring 107. Not only does this biasing effect urge pulley 97 toward a condition of maximum diameter, but it keeps belt 96 tensioned, and when the fluid in chamber 109 is vented, the spring 107 causes the diameter of pulley 97 to increase, the diameter of pulley 95 to decrease, and as sheave 100 is moved to the right (FIG. 8) it causes piston rod 104 to retract into the cylinder 91.

Manually operated directional control valve 110 controls fluid flow to and from the single-acting hydraulic cylinder 91 by directing pressure fluid from source 111 to chamber 109, and by connecting cylinder chamber 109 to drain. Interposed in the fluid supply line 112 is acceleration control valve 20, which has been previously described in detail. Valve spool 41 is operatively positioned in response to a gear change in transmission 16 by connecting linkage 43. As the higher gears of the transmission are engaged, valve 20 further restricts the flow to chamber 109 in the same manner as described in connection with FIG. 1, thus maintaining substantially the same rate of acceleration for each gear ratio.

OPERATION OF FIGURE 8

The engine drives the belt 92 and shaft 94 at a selected speed. The slowest output shaft speed of the variable speed drive 90 is obtained with the piston rod 104 fully retracted to the right. In this position the effective diameter of pulley 95 is at a minimum, and that of pulley 97 is at a maximum.

To accelerate the vehicle at its fastest rate, first gear is engaged in the gear transmission 16, which accordingly positions acceleration valve 20 at its minimum flow restriction. As directional valve 110 is moved to the right of its center position, fluid pressure is directed into chamber 109 as it is metered through valve 20. Since valve 20 is in its minimum flow restriction condition, piston rod 104 will quickly extend to its maximum stroke. As rod 104 extends and sheave 100 moves in closer proximity to sheave 99, the effective diameter of pulley 95 is increased. The compound effect of increasing the diameter of pulley 95 and decreasing that of pulley 97 causes the speed of the output shaft 98 to increase to its maximum. If a higher gear ratio is desired, for example, second gear (zero to 12 m.p.h.), as the mechanical transmission 16 is shifted, the spool 41 of acceleration valve 20 is moved to a position of greater flow restriction. The rod 104 accordingly moves outward more slowly, the diameter of pulley 95 increases more slowly, and the rate of acceleration of shafts 98 and 40 is consequently the same as when transmission 16 is in first gear. A comparable rate of acceleration is provided in third gear.

FIGURES 9 AND 10

Figure 10:
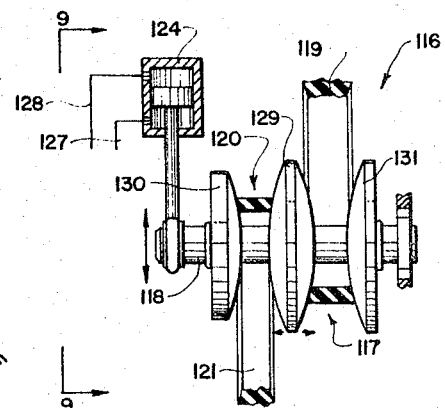
FIG. 10 is a fragmentary section taken along line 10—10 of FIG. 9.

FIGS. 9 and 10 illustrate an additional form of variable diameter pulley transmission 116, used with the acceleration control valve 20 of the present invention. The engine driven pulley 115 rotates pulley 117, and shaft 118, through belt 119. Rotating with shaft 118 is a variable diameter pulley 120, which in turn drives belt 121 and pulley 122. Pulleys 117 and 120 have a common sheave 129 (FIG. 10) which slides longitudinally on shaft 118 between fixed sheaves 130 and 131. Although not shown, pulley 122 is connected to mechanical transmission 116 in a manner similar to that shown in FIG. 8. Rotatably journaled on the end of shaft 118 is an arm 123, the other end of which is mounted on a fixed pivot, as shown. The angular position of arm 123 is varied by a servo cylinder 124, which varies the output speed of pulley 122 and its shaft. Transmission 116 differs from the FIG. 8 transmission in that the two variable radius pulleys 120 and 117 are mounted on the same shaft rather than on two separate shafts, as in the previous figure.

OPERATION FIGS. 9 AND 10

The prime mover drives pulley 115 and belt 119 at a selected speed. The slowest speed of the output shaft of the transmission 116 is accomplished with pulley 117 at its maximum effective diameter, and pulley 120 at its minimum diameter (servo cylinder 124 fully retracted). To accelerate the vehicle, directional control valve 125 is moved from its center position to the right, allowing fluid flow from source 126 to pass into the head end of cylinder 124 through line 128, while the return flow through line 127 is metered through acceleration control valve 20 into reservoir 13. As the cylinder rod begins to extend it forces arm 123 to rotate in a clockwise direction. This movement of the arm shifts shaft 118 away from pulley 115, causing belt 119 to tighten on pulley 117. As belt 119 tightens, sheave 129 is forced to slide to the left along shaft 118 (FIG. 10). Since shaft 118 is moving toward pulley 122, the slack in belt 121 allows the effective diameter of pulley 120 to increase as sheave 129 moves to the left. The combined effect of pulley 117 decreasing its diameter and pulley 120 increasing its diameter causes the speed of pulley 122 and its output shaft to increase. Deceleration of the pulley 122 is achieved by moving valve 125 to the left (criss-cross position), allowing fluid to retract the cylinder rod and rotate arm 123 in a counterclockwise direction. The acceleration and deceleration rates of the drive 116 are determined by the angular velocity of travel of arm 123, which in turn is controlled by acceleration selector valve 20, as previously described.

It is understood that variations from the form of the invention disclosed herein may be made without departure from the spirit and scope of the invention and that the drawings and specification are to be considered as merely illustrative rather than limiting.

Having described the invention with sufficient clarity to enable those familiar with the art to construct and use it, I claim:

1. An acceleration control for use on a hydromechanical drive train which includes a first variable speed transmission having a control cylinder supplied by a source of fluid pressure for changing the output speed of said transmission, a second transmission (16) having selective multiple gear ratios and coupled in driven relation with the first transmission, the control comprising:

variable restriction means (20) positioned in the fluid flow path of the cylinder, and having two or more different degrees of flow restriction;

operator means (43) connecting said restriction means to the multiple gear transmission, the restriction means being responsive in such a manner to a change in gear ratios of said second transmission that as each higher gear ratio is selected the restriction means is adjusted to provide greater flow restriction, thus increasing the time period for servo travel as each higher gear is selected.

2. An acceleration control for use in a hydromechanical drive train which includes a variable displacement piston pump (17) driven by a prime mover, a positive displacement fluid motor (23), conduit means (21 and 22) supplying motive fluid from the pump to the motor and return, a mechanical multiple gear transmission (16) driven by said motor, and fluid pressure actuated cylinder means (25) connected to the pump for controlling pump displacement, the control comprising:

variable flow restriction valve means (20) positioned in the fluid flow path of the cylinder having two or more different degrees of flow restriction; and valve operator means (43) connecting said valve means to the mechanical transmission and responsive in such a manner to a change in gear ratios of the mechanical transmission that as each higher gear ratio is selected the valve means is moved to a position of greater flow restriction, so that the time period for the servo travel is increased for each higher gear selected.

3. An acceleration control as set forth in claim 2 wherein the servo means is a double acting cylinder alternately supplied with fluid pressure in either end thereof to accordingly increase or decrease the pump displacement, the restriction valve means being located in a line which conducts fluid to and from one end of the servo.

4. An acceleration control as set forth in claim 2 wherein the servo means is a double acting cylinder alternately supplied with fluid pressure in either end thereof to accordingly increase or decrease the pump displacement, the restriction valve means being located in the line accommodating the return flow being exhausted from one end of the servo.

5. An acceleration control as set forth in claim 1 wherein the variable restriction means includes separate flow restrictors for each degree of flow restriction, and adjustable metering pins (77 and 78) in each of said restrictors whereby the flow rates thereacross can be varied to accommodate different acceleration rates for each mechanical gear ratio.

6. An acceleration control as set forth in claim 2 wherein the servo means is a double acting cylinder alternately supplied with fluid pressure at either end thereof to accordingly increase or decrease the pump displacement, the restriction means being located in the line supplying fluid pressure to the servo, said restriction means having as many flow restricting positions as there are gear ratios in the mechanical transmission, each corresponding position being progressively more restrictive, from the lowest gear ratio to the highest.

7. A hydromechanical transmission system for use between a prime mover and a mechanical load comprising:
   a variable displacement pump (17) having a tiltable swash plate;
   a positive displacement fluid motor (23) having an output shaft;
   conduit means (21 and 22) operatively connecting the pump and motor for supplying motive fluid from the pump to the motor and return, in a continuous circuit;
   a mechanical multiple gear transmission (16) connected in driven relation with the motor output shaft;
   servo means (25) operatively connected to the pump swash plate, said servo means being effective when energized to increase or decrease the fluid output of the pump;
   a fluid pressure source (30) communicating with the servo means for supplying fluid pressure to energize the servo means;
   valve means (20) positioned in the flow path between the pressure source and the servo means, said valve means having a plurality of positions of varying flow restriction; and
   valve operator means (43) connecting said valve to the mechanical transmission, and responsive to a shift of the mechanical transmission from a lower gear ratio to a higher gear ratio to move said valve means from a position of lesser flow restriction to a position of greater flow restriction, thus decreasing the fluid flow rate to the servo and increasing the time period required for the servo to increase pump output to a maximum, for each selected higher gear ratio of the mechanical transmission.

8. A hydromechanical transmission system as set forth in claim 7, in which the fluid motor also has a tiltable swash plate (24), second servo means (26) operatively connected to the motor swash plate and being effective when energized to increase the speed of the output shaft (28), said second servo means communicating with said fluid pressure source for supplying fluid pressure to energize the second servo means; displacement control means (27) interposed between said fluid pressure source and the two servo means for selectively directing pressure fluid from the source thereto, said valve means (20) being positioned in the flow path between the fluid pressure source and the displacement control means.

9. A hydromechanical transmission system as set forth in claim 7 wherein the valve means includes a valve body, a valve spool slidably mounted in the valve body, said valve spool having a first position wherein the fluid flow to the servo means is partially restricted, and having second and third valve spool positions in which the flow restriction is progressively greater for each gear position, said valve operator means being connected to the valve spool to selectively position same in response to a shift of the mechanical transmission to first, second and third gear ratios.

10. An acceleration control as set forth in claim 1, wherein the first variable speed transmission includes variable diameter pulley means interposed in the drive train, and the servo means is operably connected to said pulley means to vary pulley diameter, and hence the speed of the transmission output shaft.

11. An acceleration control as set forth in claim 1 in which the first variable speed transmission is of the V-belt type and includes a V-belt driven variable diameter pulley means interposed between the transmission input and output shafts, and the servo means is operably connected to said pulley means to increase and decrease effective diameter, and hence to vary the rate of rotational acceleration and deceleration of the transmission output shaft in response to changes in flow restriction provided by the flow restriction means.

12. In combination with a fluid pressure actuated servo-mechanism having an output member, and conduits connecting said servomechanisms to a source of fluid pressure and to a reservoir, a fluid flow control valve interposed in one of said conduits for controlling the velocity of movement of said output member, said control valve comprising:
   a valve body having an inlet and an outlet;
   a fluid flow control spool movably mounted in said body; and
   cooperating means in the body and spool, dependent upon spool position in the body for selectively defining various sized flow areas through which fluid must flow between the inlet and the outlet, to thereby selectively determine the velocity of movement of the output member of the servomechanism with relation to any predetermined volume and pressure delivery from the source.

13. In combination with a fluid pressure actuated servo-mechanism having an output member, and conduits connecting said servomechanism to a source of fluid pressure and to a reservoir, a fluid flow control valve interposed in one of said conduits for controlling the velocity of movement of said output member, said control valve comprising:
   a valve body having an inlet and an outlet;
   a fluid flow control spool movably mounted in the valve body between the inlet and outlet; and
   means on the control spool defining flow paths having specific different flow areas, said means cooperating with the valve body, when the spool is moved to different relative positions, to provide specific different degrees of flow restriction through the valve, to thereby determining the velocity of movement of the output member of the servomechanism with relation to any predetermined volume flow and pressure delivery from the source.

(References on following page)

References Cited

UNITED STATES PATENTS

| | | | |
|---|---|---|---|
| 2,858,852 | 11/1958 | Lamar | 137—625.32 |
| 3,049,149 | 8/1962 | Brueder | 137—625.68 X |
| 3,112,764 | 12/1963 | Anderson et al. | 137—625.3 X |
| 3,126,763 | 3/1964 | Bowers | 74—733 |
| 3,219,062 | 11/1965 | Glover | 137—625.22 |
| 3,221,767 | 12/1965 | McCarty et al. | 137—625.3 X |
| 3,238,724 | 3/1966 | Miller | 60—53 |
| 3,302,487 | 2/1967 | Kempson | 74—733 |

ARTHUR T. McKEON, Primary Examiner

U.S. Cl. X.R.

74—740; 137—625.32